(12) United States Patent
Omiya

(10) Patent No.: US 6,215,964 B1
(45) Date of Patent: Apr. 10, 2001

(54) PHOTOGRAPHIC CAMERA

(75) Inventor: Akio Omiya, Saitama-ken (JP)

(73) Assignee: Fuji Photo Optical Co., Ltd., Ohmiya (JP)

( * ) Notice: Subject to any disclaimer, the term of this patent is extended or adjusted under 35 U.S.C. 154(b) by 1103 days.

(21) Appl. No.: 08/589,156

(22) Filed: Jan. 22, 1996

Related U.S. Application Data

(63) Continuation of application No. 08/325,084, filed on Oct. 17, 1994, now abandoned.

(30) Foreign Application Priority Data

Oct. 19, 1993 (JP) .................................................. 5-260711

(51) Int. Cl.⁷ .................................................. G03B 17/02
(52) U.S. Cl. .................................................. 396/535; 396/539
(58) Field of Search ............................ 354/149.1, 149.11, 354/145.1, 788, 187, 195.1; 396/6, 535, 538, 539

(56) References Cited

U.S. PATENT DOCUMENTS

| | | | |
|---|---|---|---|
| 4,062,024 | * 12/1977 | Tsunekawa et al. | 354/607 |
| 4,601,562 | * 7/1986 | Yonoyama et al. | 354/170 |
| 4,712,890 | * 12/1987 | Haraguchi | 354/288 |
| 4,827,296 | * 5/1989 | Hartguchi et al. | 354/187 |
| 4,961,085 | * 10/1990 | Cho et al. | 396/6 |
| 5,153,626 | * 10/1992 | Yamamoto | 354/187 |
| 5,214,462 | * 5/1993 | Haraguchi et al. | 354/157 |
| 5,381,200 | * 1/1995 | Takagai | 354/250 |
| 5,394,214 | * 2/1995 | Petruchik | 554/288 |
| 5,436,685 | * 7/1995 | Yamashina | 354/202 |
| 5,515,135 | * 5/1996 | Katayama et al. | 354/187 |
| 5,636,343 | * 6/1997 | Yamahaka | 754/82 |

* cited by examiner

Primary Examiner—Christopher E. Mahoney
(74) Attorney, Agent, or Firm—Fish & Richardson P.C.

(57) ABSTRACT

A photographic camera has a taking lens system supported in a camera body by a lens barrel and a battery chamber which accommodates a battery and is formed adjacent to the lens barrel. At least a part of the wall defining the battery chamber is formed integrally with the lens barrel.

4 Claims, 2 Drawing Sheets

PHOTOGRAPHIC CAMERA

This application is a continuation of U.S. application Ser. No. 08/325,084, filed Oct. 17, 1994, now abandoned.

BACKGROUND OF THE INVENTION

1. Field of the Invention

This invention relates to a photographic camera which has a structure advantageous to miniaturization the camera.

2. Description of the Prior Art

There has been an increasing demand for miniaturization of cameras from the viewpoint of popularization of cameras, and various miniaturized cameras have been developed and put into practice. Though there has been known a mini size camera using a special small size film, there is a problem that resolution of the picture deteriorates and sharpness of the image deteriorates as the film size decreases and at the same time such a special small size film is less available. Accordingly, it is preferred that the camera be miniaturized while using common films. Further, it is preferred that the manufacturing cost of the camera be lowered without sacrificing the performance of the camera.

SUMMARY OF THE INVENTION

In view of the foregoing observations and description, the primary object of the present invention is to provide a structure of a photographic camera which is advantageous to miniaturization the camera and reduction in the manufacturing cost of the camera.

The photographic camera in accordance with the present invention comprises a taking lens system supported in a camera body by a lens barrel and a battery chamber which accommodates a battery and is formed adjacent to the lens barrel and is characterized in that at least a part of the wall defining the battery chamber is formed integrally with the lens barrel.

When the wall of the battery chamber, which is conventionally formed as a part of the camera body or as a part separate from the camera body, is formed integrally with the lens barrel, the lens barrel and the battery chamber can be handled as a unit part in the manufacturing step of the camera, whereby the number of parts is reduced and the manufacturing cost can be lowered. Further, as compared with the case where the battery chamber and the lens barrel are two separate parts, the wall between the battery chamber and the fixed lens barrel can be reduced in thickness and the size of the camera body can be reduced by the reduction in thickness of the wall between the battery chamber and the lens barrel.

DESCRIPTION OF THE PREFERRED EMBODIMENTS

Figure 1:
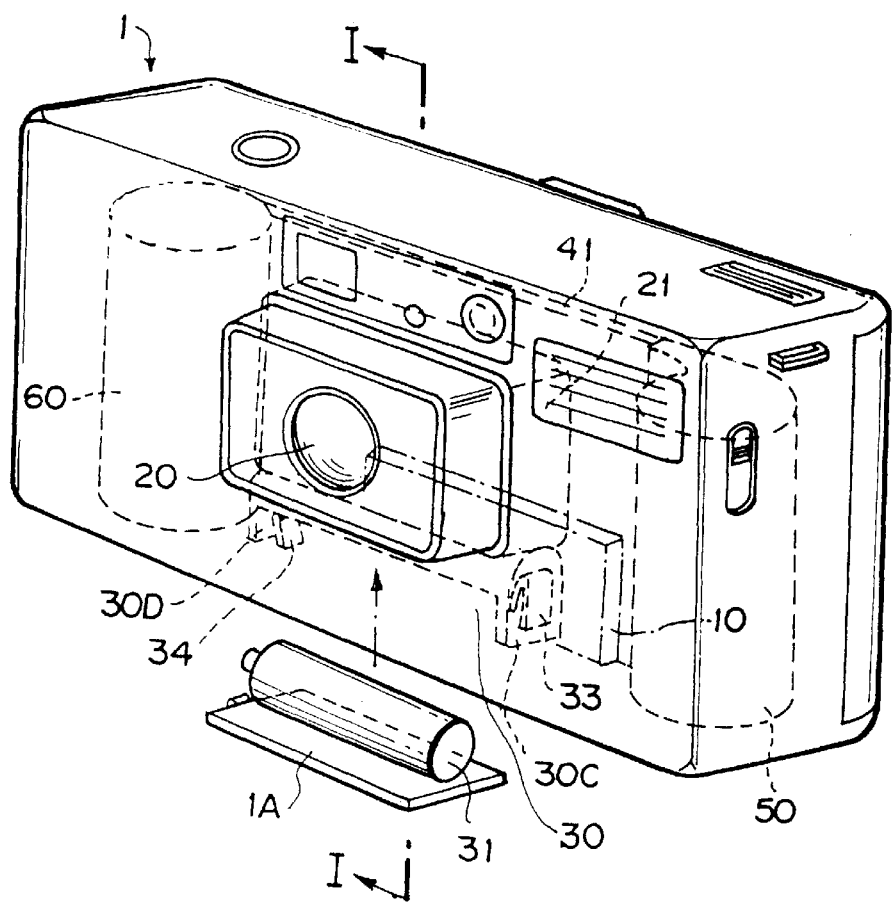
FIG. 1 is a perspective view of a photographic camera in accordance with an embodiment of the present invention.
Figure 2:
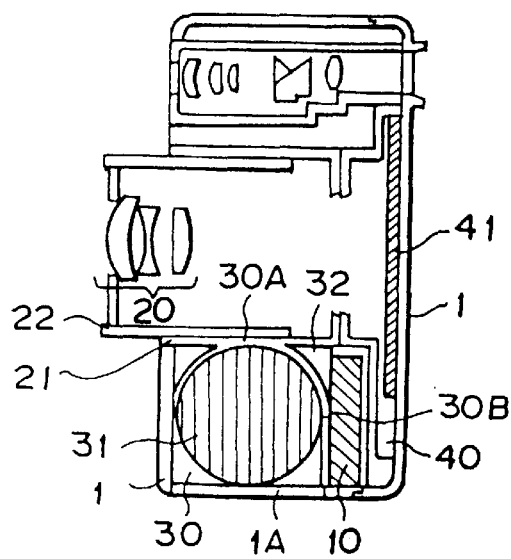
FIG. 2 is a cross-sectional view taken along line II—II in FIG. 1.

In FIGS. 1 and 2, a photographic camera in accordance with an embodiment of the present invention comprises a camera body 1 and a taking lens system 20 which is supported in the camera body 1 by way of a movable lens barrel 22 and a fixed lens barrel 21. A film magazine chamber 50 in which a film magazine is loaded and a film take-up chamber 60 in which a roll film 41 in the film magazine is taken up are formed in the camera body 1 on opposite sides of the taking lens 1, respectively. A battery chamber 30 for accommodating a battery 31 is formed on the lower side of the fixed lens barrel 21. An upper part 30A of the wall defining the battery chamber 30 is formed integrally with the fixed lens barrel 21. The battery chamber 30 opens in the bottom of the camera body 1 and is closed by a lid 1A. Right and left end walls of the battery chamber 30 are respectively provided with contacts 33 and 34.

When the battery chamber 30 is formed integrally with the fixed lens barrel 21, the fixed lens barrel 21 and the battery chamber 30 can be handled as a unit part in the manufacturing step of the camera, whereby the number of parts is reduced and the manufacturing cost can be lowered. Further, as compared with the case where the battery chamber 30 and the fixed lens barrel 21 are two separate parts, the wall between the battery chamber 30 and the fixed lens barrel 21 can be reduced in thickness and the height of the camera body 1 can be reduced by the reduction in thickness of the wall between the battery chamber 30 and the fixed lens barrel 21.

In this particular embodiment, an electric part chamber 10 for accommodating electric parts such as a control circuit for controlling an automatic exposure system, an autofocus system, a strobe, a zoom lens drive system, a film feed system and the like is formed behind the battery chamber 30 between the battery chamber 30 and the film passage 40 through which the film 41 is fed. A part 30B of the wall defining the battery chamber 30 doubles as a part of the wall defining the electric part chamber 10. By accommodating the electric parts in a relatively dead space between the battery chamber 30 and the film passage 40, the space factor in the camera body 1 is improved and the camera body 1 can be more compact in size.

Further in this particular embodiment, the part 30A of the wall defining the battery chamber 30 is arcuated in cross-section and is shaped to the contour of the battery 31 as clearly shown in FIG. 2, and a space 32 is formed between the wall of the battery chamber 30 and the fixed lens barrel 21. The space 32 can be used for accommodating electric parts, whereby the space factor in the camera body 1 is further improved.

Figure 3:
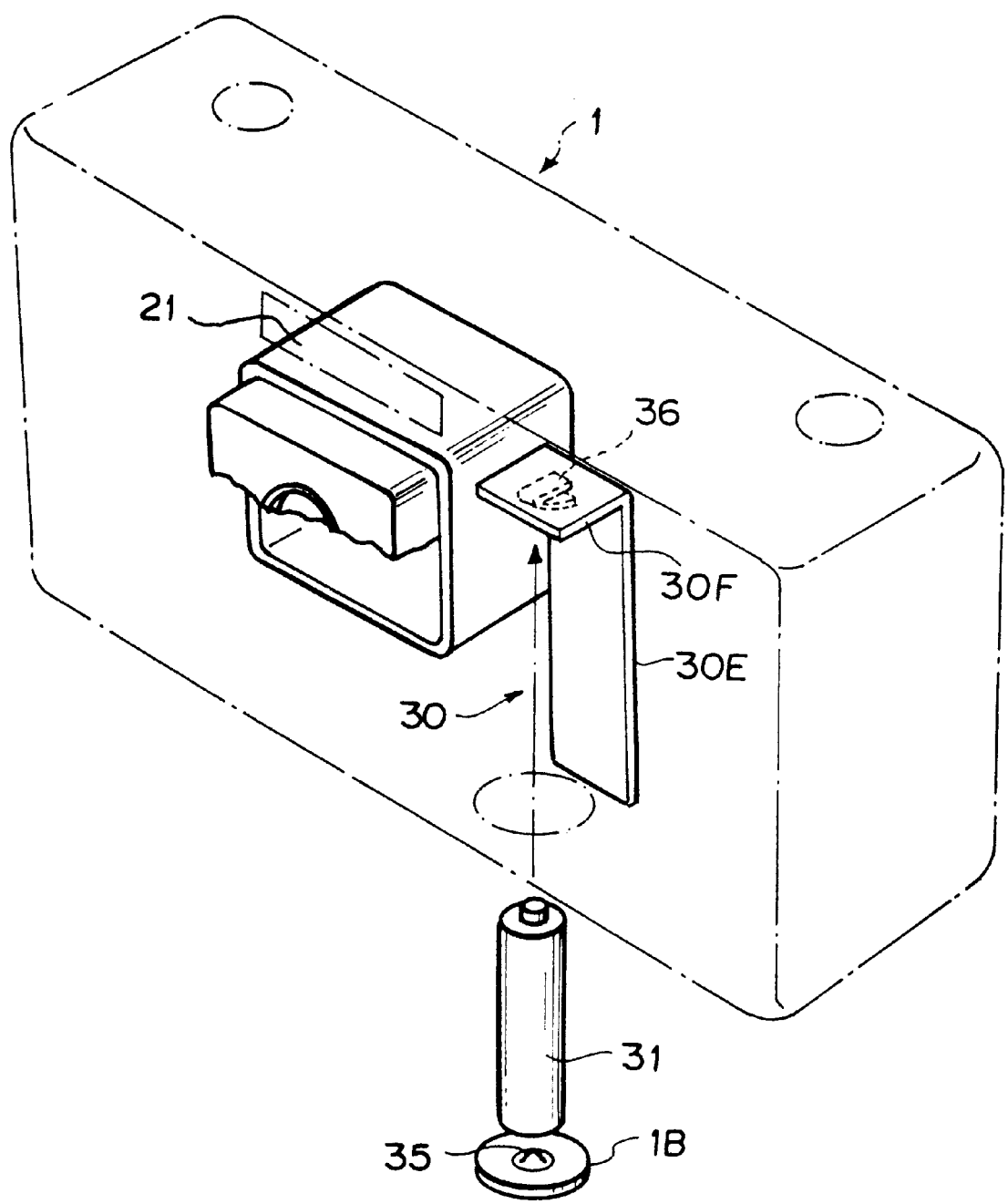
FIG. 3 is a perspective view of a camera in accordance with another embodiment of the present invention.

In another embodiment shown in FIG. 3, a rear wall 30E, a top wall 30F and one side wall of the battery chamber 30 are formed integrally with the fixed lens barrel 21 and the battery 31 is stored in the battery chamber 30 in a vertical position. One of the contacts 36 for the battery 31 is provided on the lower surface of the top wall 30F and the other contact 35 is provided on the upper surface of a lid 1B.

What is claimed is:

1. A photographic camera comprising a taking lens system supported in a camera body by a lens barrel, film chambers, and a battery chamber which accommodates a battery and is formed adjacent to the lens barrel, the battery chamber being located outside of the film chambers, the camera characterized in that at least part of the wall defining the battery chamber is formed integrally with the lens barrel so that said part of the wall also comprises a portion of the lens barrel.

2. A photographic camera as defined in claim 1 in which said lens barrel comprises a movable lens barrel and a fixed lens barrel which supports the movable lens barrel to be movable in the direction of the optical axis of the taking lens system, and said part of the wall of the battery chamber is formed integrally with the fixed lens barrel so that said part of the wall also comprises a portion of the fixed lens barrel.

3. A photographic camera system as defined in claim 2, wherein said part of the wall of the battery chamber that is formed integrally with the fixed lens barrel is arcuate in cross-section and is shaped to the contour of the battery.

4. The photographic camera of claim 1, wherein the battery chamber is positioned between the film chambers.

* * * * *